UNITED STATES PATENT OFFICE.

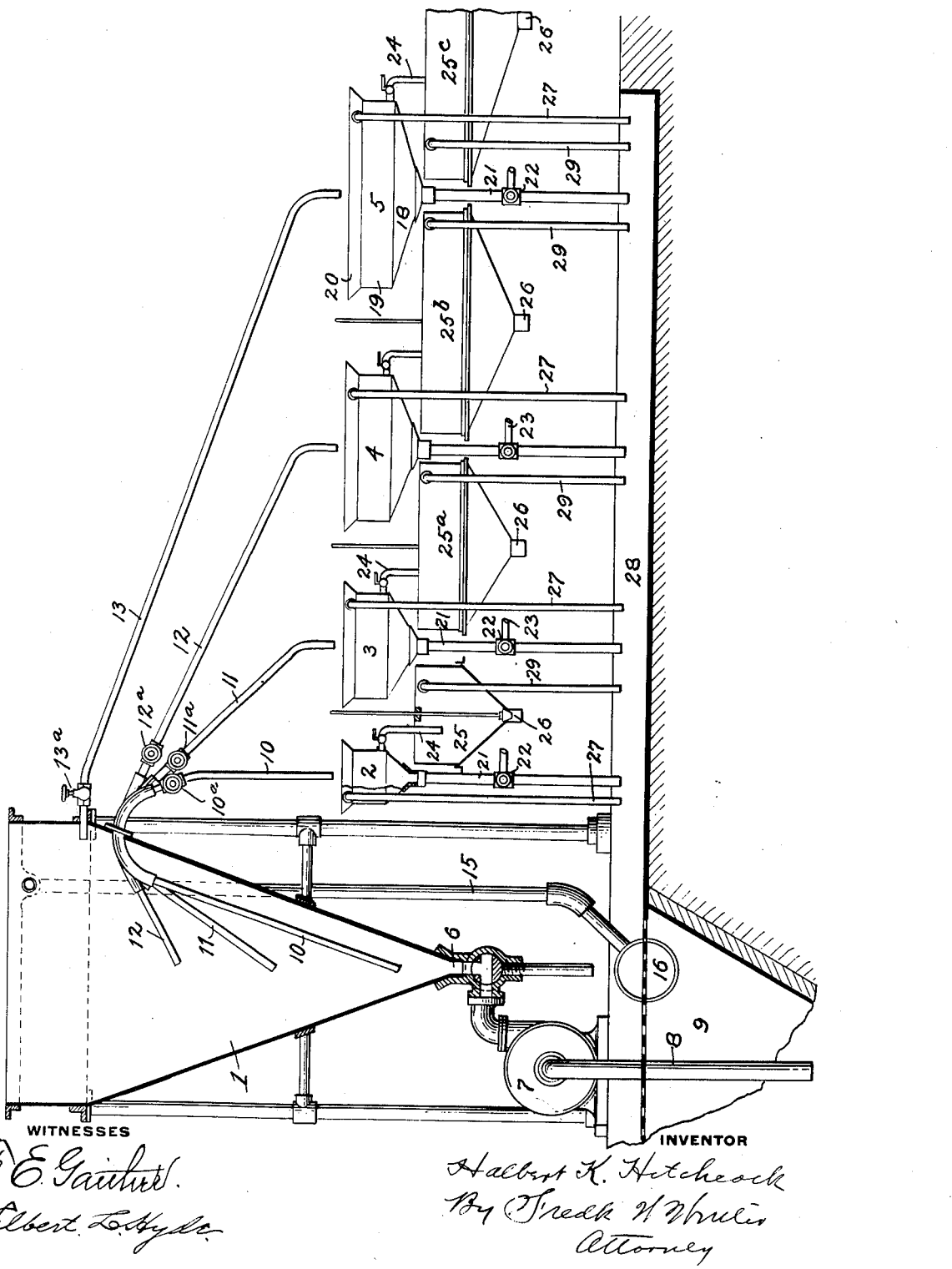

HALBERT K. HITCHCOCK, OF TARENTUM, PENNSYLVANIA.

METHOD OF AND APPARATUS FOR GRADING FINELY-DIVIDED MATERIALS.

1,100,302. Specification of Letters Patent. Patented June 16, 1914.

Application filed June 7, 1912. Serial No. 702,265.

*To all whom it may concern:*

Be it known that I, HALBERT K. HITCHCOCK, a resident of Tarentum, in the county of Allegheny and State of Pennsylvania, have invented a new and useful Improvement in Methods of and Apparatus for Grading Finely-Divided Materials, of which the following is a specification.

This invention relates to method and apparatus for grading or separating finely divided material comprising particles having different physical characteristics, into grades, each of which includes those particles having similar physical characteristics. The invention is applicable, for example, for grading material used as abrasives, such as employed in the grinding and polishing of glass and other substances, to binders used in ceramics, and in fact for grading any finely divided material.

The invention has for its object to provide method and apparatus whereby the material can be accurately separated into its several grades, insuring each grade being limited practically entirely to particles having the same size or physical characteristics, and whereby such grading can be accomplished conveniently, economically and on a large scale.

The accompanying drawing is a diagrammatic sectional elevation of one form of apparatus embodying the invention.

The apparatus necessary to carry out the method requires a primary grading vessel 1 and as many secondary grading vessels as the required number of grades into which the material is to be divided, the drawings showing four secondary grading vessels 2, 3, 4 and 5, but obviously, the number can be reduced or increased as desired. In each of the grading vessels the material is graded while in suspension in a liquid, preferably water. The principle of separation or grading of the material in the vessels is similar to that described in my Patent No. 934,441, of September 21, 1909, and the principles governing this grading action may be briefly stated as follows: A body falling freely in vacuum has a uniformly accelerated velocity, increasing each second 32 feet, which increment of velocity is due to gravity. This acceleration is the same for all bodies falling in vacuum. If instead of falling in a vacuum the body falls through a liquid, its fall is resisted in proportion to its projection of area in a horizontal plane and to its wetted surface. This resistance increases as the square of its velocity. Therefore, since the force of gravity remains constant while the resistance to the falling of the body through the liquid increases as the square of the velocity, sooner or later this resistance must equal and absorb the acceleration due to gravity, after which time the body falls with a constant velocity, which may be termed its critical velocity for that liquid.

The wetted area and horizontal projection of bodies of similar contour increase as the square of any of their similar dimensions. Their weight, however, increases as their density and the cube of their similar dimensions. Therefore, this constant or critical velocity while falling in the liquid increases with increase in size of the bodies or particles, so that if bodies having similar shapes and densities but varying in size are thrown into a vertical cylindrical tank filled with liquid but of infinite length, the particles will begin to separate according to size, the larger particles falling faster than the smaller particles, the distance separating them increasing with the time. In addition to this natural separation, the heavier particles displace their own volume of water, thus creating an upward current equal in volume to the water displaced by the downward movement of the particles. This upward current increases from the lowest particles to the highest, due to the added volume displaced by the particles above, and serves to still further retard the downward movement of the particles higher up. Consequently, if the quantity of solids added is sufficient and the finest particles are small enough, these finer particles will be carried upward by this current and be washed out over the top of the cylinder. If instead of using a cylinder an inverted cone or pyramid is used, the coarser particles as they fall are crowded together by the downwardly converging walls so that their volume forms a gradually increasing proportion of the total cross sectional area of the vessel, and greatly increases the upward velocity in the lower part and magnifies the grading action. It is obvious, therefore, that a cone can be constructed having sides at such an angle as to give a constant velocity upward from the bottom to the top for any given mixture of solids continuously introduced into the vessel, or the angularity of the sides could be so proportioned as to give an increasing velocity from the bottom to the top, and vice versa. If instead of having a cone of infinite length we take a cone of finite length and discharge the mixture so that the solids are discharged as fast as they reach a given point or strata, we have to all intents and purposes the same action in the liquid as we would have in the case of the hypothetical cone of infinite length. This grading action is not dependent upon the manner of, or place at which the liquid and particles are introduced into the cone. They can both be introduced separately or mixed together at the top or at the bottom. The principle of operation is the same in all cases, but when the liquid at least is introduced through the bottom or apex of the cone, the upward current is more pronounced than if the liquid were introduced through the top of the cone. Either method of introduction into the primary cone is within the spirit of the invention.

The above principle of grading applies to both the primary and the secondary grading vessels illustrated on the drawing, applying strictly in the case of the primary grading vessel and with only a modification to secure a greater certainty of grading in the secondary grading vessels, as will hereinafter more fully appear.

The liquid and the particles to be graded may be introduced into the primary grading vessel or cone 1 in any suitable manner either separately or mixed together and either at the bottom or at the top. The drawing shows them being introduced through the bottom opening 6 by means of a centrifugal pump 7 drawing the mixture through pipe 8 from any suitable source, such as the vessel, tank or sump 9. If desired, the material to be graded can be introduced into the vessel at the top, and a jet or supply of water introduced through the bottom, as described in my Patent No. 934,441, or the material and water can both be introduced at the top. In any case, there is produced an upward flow of liquid relative to the movement of the particles in the liquid, and with the form of apparatus illustrated there is a constant upward current of water in the cone, which current decreases in velocity upwardly due, first, to the increasing diameter of the cone, and, second, to the restriction of its cross sectional area by the solid particles therein, which is greatest near the bottom of the cone where the coarser particles collect. The result is that the particles are separated according to their sizes or physical characteristics, the particles of a certain size or physical characteristics remaining in a definite zone or stratum in the vessel. This produces a primary and approximately accurate grading of the material. Each grade, however, will contain a small percentage of particles of a different grade, due to the inability of all of the particles to find their own level or strata on account of being caught with other particles, or for other reasons.

The presnt invention takes the several grades from the cone separately and independently and regrades the same so as to eliminate from the same the particles which do not belong to that grade. This is effected in the secondary grading vessels 2, 3, 4 and 5 to which the various grades in the vessel 1 are respectively taken.

It is preferred to withdraw the several grades from the vessel 1 for regrading continuously so as to carry on a practically continuous operation. For this purpose, pipes are arranged to separately withdraw the several grades from the vessel 1. As many of these withdrawal pipes will be provided as the grades intended to be handled, and each of said pipes leads to a secondary grading vessel. For the purpose of illustration, four such pipes leading to four regrading vessels have been shown. These pipes, numbered respectively, 10, 11, 12 and 13, (except pipe 13) project into the cone 1 toward its center and the open ends thereof terminate at different heights therein, practically in the zones of the particular grades which are to be withdrawn from the respective pipes. The pipes 10, 11 and 12 extend through the side wall of the cone 1, preferably at the same level, and lead to the respective secondary grading vessels 2, 3 and 4, the coarsest grade from pipe 10 going to grading vessel 2, the next finer grade going through pipe 11 to regrading vessel 3, the next finer grade going through pipe 12 to regrading vessel 4, and the upper or finest grade going through pipe 13 to regrading vessel 5. The very fine particles, too fine for practical use, the scum, dirt, and other like matter, escape from the top of the cone 1 through overflow pipe 15 leading to a sewer 16 or other place for waste deposit. The sewer 16 also takes care of the overflow from sump 9. The several withdrawal pipes are provided with regulating and cut-off valves, marked respectively 10$^a$, 11$^a$, 12$^a$ and 13$^a$.

The withdrawal pipes from the primary cone discharge into the secondary grading vessels preferably through the top. The secondary grading vessels are preferably of the form shown, having a conical lower portion 18 with upwardly diverging walls, a cylindrical portion 19 immediately thereabove, and a flaring portion 20 at the extreme top. In the bottom or apex of each of these cones is an inlet 21 preferably controlled by valve 22, and connected to a supply pipe 23 for admitting fluid, such as water under pressure, to create an upward current in the grading vessels. At the upper edge of the conical portion 18 is a discharge or outflow pipe 24, preferably valve controlled, as shown, for the graded material, which discharge pipes may lead to any suitable destination, the drawings diagrammatically showing these various pipes discharging into receiving vessels 25, 25ª, 25ᵇ and 25ᶜ, respectively, each provided in the bottom with a valve controlled discharge outlet 26. Just above the cylindrical portion 19 is an overflow connection 27 for the material finer than the particular grade intended to be drawn from the respective grading vessel. These several overflow connections 27 discharge into a conduit 28 leading back to the reservoir or sump 9. The receiving vessels 25, 25ª, 25ᵇ and 25ᶜ are also provided near their tops with overflow connections 29 discharging into the conduit 28, for drawing off the excess water.

Secondary grading vessels of the form shown provide for a decreasing upward velocity of the liquid entering at the bottom, in the conical portion 18, and a constant upward velocity in the cylindrical portion 19. The discharge orifice 24 is arranged so as to withdraw a certain volume, which we may designate by $x$. The supply is of larger capacity, supplying a volume which may be designated as $x+x'$. Consequently, in the cylindrical portion 19 volume $x'$ must flow upwardly, but on account of the cylindrical form of this portion of the vessel the upward flow therein is constant instead of decreasing. The vessel is so shaped and proportioned that the constantly decreasing flow of volume $x+x'$ upwardly in the conical portion 18 holds the particular grade to be withdrawn in equilibrium in a zone opposite the discharge orifice 24, while the constant but lesser velocity of volume $x'$ in the cylindrical portion 19 carries upwardly and out through the overflow 27 all particles of a finer grade than the desired one. The consequence is that the grade discharged through orifice 24 is practically pure, that is of absolutely uniform sized particles. The finer particles from each of these vessels go back, as above stated, to the primary grading vessel where the same are regraded and withdrawn to the several secondary vessels.

The several withdrawal pipes 10, 11, 12 and 13 from the primary grading vessel can be left open continuously, as the aim is to carry on a continuous grading operation. These pipes, however, preferably are provided with control valves, as shown, for varying or adjusting the discharge therefrom, or entirely cutting the same off.

The several secondary grading vessels 2, 3, 4 and 5 are of progressively increasing size, varying as the cross sectional areas of the primary cone at the levels from which their respective grades are drawn, that is, the levels at which the several withdrawal pipes 10, 11, 12 and 13 open into the primary cone. The amount of material withdrawn through each of the pipes 10, 11, 12 and 13 varies approximately according to the cross sectional area of the cone 1 at the levels at which said pipes respectively open, and the several secondary grading vessels are of such sizes respectively as to take care of the quantities withdrawn from those several levels. The receiving or storage receptacles 25, 25ª, 25ᵇ and 25ᶜ are also of sizes proportionate to the quantities of material handled by the corresponding secondary grading vessels.

By means of the apparatus described, the material is very accurately and with certainty divided into definite and uniform grades.

The apparatus is of simple construction and as the process can be carried on continuously, such apparatus has a large capacity. It requires a minimum amount of attention, is economical, and highly efficient.

Many changes can be made in the form and arrangement of the apparatus without departing from the spirit of the invention. In actual use a relatively large number of secondary grading vessels with a corresponding number of withdrawal pipes from the primary grading vessel may be employed. In the drawing only four such secondary vessels and discharge pipes have been illustrated, merely for the purpose of simplicity in illustration and to prevent confusion.

What I claim is:

1. The method of grading finely divided material mixed with a liquid, which consists in introducing the material into a vessel or tank and producing therein a downward flow or travel of the material relative to the liquid at velocities increasing downwardly in said vessel or tank and thereby separating the material into grades, withdrawing the several grades from said vessel or tank separately and independently, introducing each of said grades independently of any other grade into another vessel or tank, maintaining in each of said last named vessels or tanks at a given level an upward flow of liquid at a velocity substantially proportional to the velocity of flow of the corresponding grade in said first named vessel or tank, and withdrawing the material from each of said last named vessels or tanks at said given level.

2. The method of grading finely divided material mixed with a liquid, which consists in introducing the material into a vessel or tank and producing therein a downward flow or travel of the material relative to the liquid at velocities increasing downwardly in said vessel or tank and thereby separating the material into grades, withdrawing the several grades from said vessel or tank separately and independently, introducing each of said grades into another vessel or tank, maintaining in said last named vessels or tanks an upward flow of liquid at velocities substantially proportional to the velocities of flow of the corresponding grades in said first named vessel or tank to separate in each of said last named vessels or tanks material of definite grade, withdrawing the material of definite grade from each of said last named vessels or tanks at a given level, and returning material not of the definite grades from said last named vessels or tanks to said first named vessel or tank to be regraded therein.

3. Apparatus for grading finely divided material mixed with a liquid, comprising a primary grading vessel, connections for producing an upward flow of liquid therein, the velocity of flow of said liquid decreasing upwardly, said vessel being provided with an overflow connection and with a withdrawal opening for a defined grade intermediate its top and bottom, in combination with a secondary grading vessel arranged to receive from the primary grading vessel said grade independently of the other grades and provided with connections arranged to produce an upward flow of liquid therein at a velocity substantially equal to the velocity of liquid in said primary vessel at the withdrawal opening, said secondary grading vessel being provided with an overflow and with a withdrawal outlet located intermediate its top and bottom, and means for returning the overflow from said secondary grading vessel to the primary grading vessel.

4. Apparatus for grading finely divided material mixed with a liquid, comprising a primary grading vessel of inverted conical form, connections for producing an upward flow of liquid therein, a plurality of withdrawal pipes opening into said vessel at different levels for separately withdrawing defined grades therefrom, in combination with a plurality of secondary grading vessels, each for receiving one of the grades from the primary grading vessel, said secondary grading vessels being of inverted conical form at the bottom and of cylindrical form thereabove, the diameters of the cylindrical portions of said secondary vessels varying substantially according to the dimensions of said primary grading vessel at the levels of the corresponding withdrawal pipes, said secondary vessels having connections for producing a liquid inflow at the bottom and a withdrawal outlet near the top of the conical portion.

5. Apparatus for grading finely divided material mixed with a liquid, comprising a primary grading vessel, connections for producing therein a downward flow or travel of the material relative to the liquid at velocities increasing downwardly therein, a plurality of withdrawal pipes communicating with said vessel at different levels, in combination with a plurality of secondary grading vessels each for receiving one of the grades from the primary vessel, means for producing in each of said secondary vessels an upward flow of liquid at a velocity corresponding to the velocity of flow in said primary vessel at the level of the corresponding withdrawal pipe to separate out all material not of the defined grade, and means for returning material not of the defined grade to the primary grading vessel to be regraded therein.

6. Apparatus for grading finely divided material mixed with a liquid, comprising a primary grading vessel, connections for producing therein a downward flow or travel of the material relative to the liquid at velocities increasing downwardly therein, a plurality of withdrawal pipes communicating with said vessel at different levels, in combination with a plurality of secondary grading vessels each for receiving one of the grades from the primary vessel, means for producing in each of said secondary vessels an upward flow of liquid at a velocity corresponding to the velocity of flow in said primary vessel at the level of the corresponding withdrawal pipe to separate out all material not of the defined grade, and connections for returning from said secondary vessels to the primary vessel material not of the defined grade.

7. Apparatus for grading finely divided material mixed with a liquid, comprising a primary grading vessel, connections for producing therein a downward flow or travel of the material relative to the liquid at velocities increasing downwardly in said grading vessel to separate the material into grades, in combination with a secondary grading vessel arranged to receive one of the grades from said primary grading vessel independently of all other grades, means for producing in said secondary grading vessel a downward flow or travel of the material relative to the liquid at different velocities in different zones, the velocity in the bottom zone of said secondary grading vessel being greater than the velocity in the primary grading vessel in the zone of withdrawal of the grade being conducted to the secondary grading vessel, and the velocity in the secondary grading vessel in the zone above said bottom zone being substantially equal to the velocity in the primary grading vessel in said withdrawal zone, and means for returning a portion of the material from the secondary to the primary grading vessel.

8. Apparatus for grading finely divided material mixed with a liquid, comprising a primary grading vessel, connections for producing therein a downward flow or travel of the material relative to the liquid at velocities increasing downwardly in said grading vessel to separate the material into grades, in combination with a plurality of secondary grading vessels, each for receiving one of the grades from said primary grading vessel, and means for producing in each of said secondary grading vessels a downward flow or travel of the material relative to the liquid at different velocities in different zones, the velocity in the bottom zone of each secondary grading vessel being greater than the velocity in the withdrawal zone of the primary grading vessel corresponding to said secondary grading vessel, the velocity in the intermediate zone in the secondary grading vessel above said bottom zone being substantially equal to the velocity in said withdrawal zone of the primary grading vessel, and the velocity in the top zone of the secondary grading vessel being such as to carry off all material finer than the defined grade therein, and an overflow connection from the top zone of each secondary grading vessel, said connection being arranged to return the fine material to the primary grading vessel.

9. Apparatus for grading finely divided material mixed with a liquid, comprising a primary grading vessel of inverted conical form, a connection for producing an upward flow of liquid therein, and a plurality of withdrawal pipes opening into said vessel at different levels, in combination with a plurality of secondary grading vessels each for receiving one of the grades from the primary vessel, said secondary vessels in cross sectional dimensions varying according to the cross sectional dimensions of the primary cone from which their respective grades are drawn, and means for producing an upward flow of liquid in each of said secondary vessels to separate out all of the material not of the defined grade.

10. Apparatus for grading finely divided material mixed with a liquid, comprising a primary grading vessel of inverted conical form, a connection for producing an upward flow of liquid therein, and a plurality of withdrawal pipes opening into said vessel at different levels, in combination with a plurality of secondary grading vessels each for receiving one of the grades from the primary vessel, said secondary vessels in cross sectional dimensions varying according to the cross sectional dimensions of the primary cone from which their respective grades are drawn, means for producing an upward flow of liquid in each of said secondary vessels to separate out all of the material not of the defined grade, and connections for returning from said secondary vessels to the primary vessel the material not of the defined grade.

11. The method of grading finely divided material while in suspension in a liquid, which consists in projecting the material in suspension in liquid upwardly through the bottom of a vessel and thereby separating it into grades, withdrawing the coarse material from near the bottom of said vessel, and subjecting each of the remaining grades independently of every other grade to the upward flow of liquid in one of a series of subsequent grading vessels, the upward flow in each of said subsequent vessels being proportional to the largest particles delivered thereto.

12. The method of grading finely divided material while in suspension in a liquid, which consists in projecting the material in suspension in liquid upwardly through the bottom of a vessel, withdrawing the coarse material from near the bottom of said vessel, subjecting each of the remaining grades independently of every other grade to the upward flow of liquid in one of a series of subsequent grading vessels, the upward flow in each of said subsequent vessels being proportional to the largest particles delivered thereto, and withdrawing from each of said subsequent vessels a definite grade coarser than that withdrawn from the next succeeding vessel.

13. The method of grading finely divided material while in suspension in a liquid, which consists in projecting the material in suspension in liquid upwardly through the bottom of a vessel and thereby separating out the coarsest material, withdrawing said coarse material from near the bottom of said vessel, and subjecting the remaining material to the upward flow of liquid in a series of subsequent grading vessels, the velocity of the upward flow in each of said subsequent vessels being less than in the preceding one of said series.

14. The method of grading finely divided material while in suspension in a liquid, which consists in introducing the same into a primary grading vessel or tank and there subjecting the material to an upward movement of the liquid relative to the material, withdrawing the coarsest grade from near the bottom of said vessel, conducting the finer material to a series of secondary grading vessels and separating a different definite grade in each one thereof, and conducting the overflow from at least one of said secondary grading vessels back to the primary grader to be regraded therein.

15. The method of grading finely divided material mixed with a liquid, consisting in introducing the same into a primary grading vessel or tank and producing therein a downward flow or travel of the material relative to the liquid and separating the material into grades, withdrawing a coarse grade from near the bottom of said vessel or tank, withdrawing finer material from above the bottom portion of said vessel or tank into a secondary grading vessel or tank and producing therein a downward flow or travel of the material relative to the liquid, and returning the finer material from said secondary grading vessel to said primary grader and regrading the same therein.

16. The method of grading finely divided material mixed with a liquid, consisting in introducing the same into a primary grading vessel and producing therein a downward flow or travel of the material relative to the liquid, thereby separating the material into grades, withdrawing a coarse grade from near the bottom of said primary grading vessel, simultaneously withdrawing finer material from above the bottom portion of said grading vessel into a secondary grading vessel or tank and producing therein a downward flow or travel of the material relative to the liquid, and returning the fine material from said secondary grading vessel to said primary grader and regrading the same therein, while at the same time holding the coarser material in suspension in the liquid in said secondary grading vessel.

In testimony whereof, I have hereunto set my hand.

HALBERT K. HITCHCOCK.

Witnesses:
F. W. WINTER.
WILLIAM B. WHARTON.